(No Model.)

C. H. R. BOCK.
MUSIC BOX.

No. 555,757.  Patented Mar. 3, 1896.

Witnesses.
Robert Evatt
Thos. A. Gurie

Inventor.
Christian H. R. Bock.
By James L. Norris.
Atty.

UNITED STATES PATENT OFFICE.

CHRISTIAN HEINRICH RICHARD BOCK, OF LEIPSIC-GOHLIS, GERMANY.

MUSIC-BOX.

SPECIFICATION forming part of Letters Patent No. 555,757, dated March 3, 1896.

Application filed March 5, 1894. Serial No. 502,381. (No model.)

*To all whom it may concern:*

Be it known that I, CHRISTIAN HEINRICH RICHARD BOCK, of Leipsic-Gohlis, in the Kingdom of Saxony, German Empire, have invented certain new and useful Improvements in Music-Boxes, of which the following is a specification.

This invention relates to music-boxes wherein a rotating cylinder acts upon a tuned comb.

The object of my present invention is to provide a new and improved construction of cylinder for sounding the prongs or teeth of the tuned comb; and to accomplish this object my invention consists essentially in a cylinder for music-boxes, composed of a number of metal disks formed integral with peripheral teeth, and with grooved portions between the toothed peripheries and the centers of the disks, an axle on which the disks are mounted, and means for securing the disks in position on the axle.

The invention is illustrated by the accompanying drawings, in which—

Figure 1:
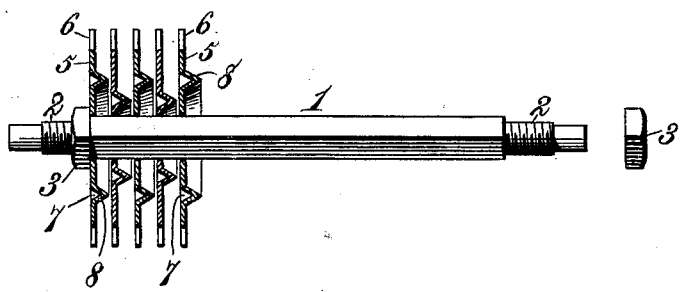
Figure 2:
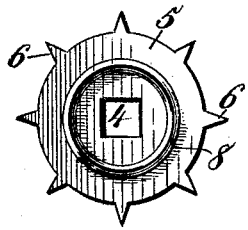
Figure 3:
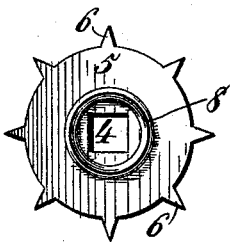

Figure 1 is a longitudinal sectional view of a portion of a rotatable cylinder embodying my invention, and Figs. 2 and 3 are elevations of two of the toothed metal disks.

In order to enable those skilled in the art to make and use my invention I will now describe the same in detail, referring to the drawings, wherein—

The numeral 1 indicates an axle or shaft having screw-threaded end portions 2 provided with clamping screw-nuts 3, between which the improved toothed metal disks are confined on the axle. The body of the axle between the screw-threaded portions is preferably angular in cross-section to fit angular central orifices 4 formed in the metallic disks 5. The angular portion of the axle, as here shown, is square, and the orifices 4 are correspondingly shaped. The metal disks are each formed integral with a plurality of teeth 6 extending radially therefrom and preferably V-shaped. These peripheral teeth are disposed around the periphery of the disks to suit the conditions required for sounding the prongs or teeth of a tuned comb. The metal disks mounted on the axle or shaft require to be spaced apart, and to accomplish this object by very simple, efficient and economical means I form each disk integral with an annular groove in one side, as at 7, so that the metal is pressed out at the opposite sides to form an annular approximately V-shaped spacing-flange 8. The annular grooves are formed by punching or pressing the metal of the disks, so that the metal is displaced to form the annular spacing-flanges, in such manner that the flange of one disk can bear against the side surface of an adjacent disk. By this means all the disks are properly spaced apart. In order to prevent the grooved portion of one disk from coinciding with the grooved portion of the adjacent disk I prefer to form the grooves in alternating disks at different distances from the center.

The peripheral teeth formed integral with the metal disks are designed to take the place of the ordinary inserted pegs or pins of the usual cylinders for music-boxes.

My invention renders it possible to very economically manufacture toothed cylinders for music-boxes, and at the same time secures a construction which is light in weight and enables the cylinders to be made quite large in diameter, so that they can be provided with a large number of teeth, which is very desirable.

If the teeth of one disk should become broken or damaged a new disk can be easily substituted therefor.

Having thus described my invention, what I claim is—

1. A cylinder for a music-box, consisting of a plurality of metal disks formed integral with peripheral teeth and with grooved portions between the toothed peripheries and the centers thereof, an axle common to all the disks, and means for securing the disks in position on the axle, substantially as described.

2. A circular disk having the radially-projecting teeth 6, the grooved portion 7, and the central orifice 4 for the reception of an axle, substantially as and for the purpose set forth.

In testimony whereof I have signed my name to this specification, in the presence of two subscribing witnesses, this 14th day of February, 1894.

CHRISTIAN HEINRICH RICHARD BOCK.

Witnesses:
 MAX LOUI SCHMIDT,
 RICHARD FENTZSCH.